US009658972B1

(12) United States Patent
Sedberry, Jr. et al.

(10) Patent No.: US 9,658,972 B1
(45) Date of Patent: May 23, 2017

(54) UNIVERSAL PULL-THROUGH RECEIVER

(71) Applicant: MAC Panel Company, High Point, NC (US)

(72) Inventors: Philip Anthony Sedberry, Jr., High Point, NC (US); David Mark Wilson, Kernersville, NC (US); Donald Wayne Helton, Ridgeway, VA (US); Christopher John Boggs, Trinity, NC (US); James Alan Hall, High Point, NC (US); Glen Christopherson, High Point, NC (US)

(73) Assignee: Mac Panel Company, High Point, NC (US)

( * ) Notice: Subject to any disclaimer, the term of this patent is extended or adjusted under 35 U.S.C. 154(b) by 699 days.

(21) Appl. No.: 14/082,445

(22) Filed: Nov. 18, 2013

Related U.S. Application Data

(60) Provisional application No. 61/728,375, filed on Nov. 20, 2012.

(51) Int. Cl.
*G06F 13/20* (2006.01)
(52) U.S. Cl.
CPC .................................... *G06F 13/20* (2013.01)
(58) Field of Classification Search
CPC ...................................................... G06F 13/20
See application file for complete search history.

(56) References Cited

U.S. PATENT DOCUMENTS

| 4,219,935 | A | 9/1980 | Braginetz et al. ........... 33/174 R |
| 4,329,005 | A * | 5/1982 | Braginetz ................ G01R 1/04 439/51 |
| 6,547,587 | B2 | 4/2003 | Hurst et al. .................... 439/532 |
| 7,091,415 | B2 | 8/2006 | Ashby et al. ................. 174/52.1 |
| 2009/0089623 | A1* | 4/2009 | Neering ............. G01R 31/3183 714/39 |
| 2009/0223712 | A1* | 9/2009 | Stowers ............... H01R 13/514 174/535 |
| 2013/0045625 | A1* | 2/2013 | Sedberry, Jr. ......... G01R 1/0408 439/540.1 |
| 2014/0062516 | A1* | 3/2014 | Rashidzadeh ........ G01R 1/0408 324/750.19 |

* cited by examiner

*Primary Examiner* — Nimesh G Patel
(74) *Attorney, Agent, or Firm* — MacCord Mason PLLC

(57) ABSTRACT

A hybrid mass interconnect system and universal pull-through receiver are shown and described. In one embodiment, a universal receiver for a mass interconnect system includes a frame, a connection assembly and a universal interconnect module. Typically, the receiver supports a variety of testing platforms, including PXI-based platforms, LXI-based platforms, AXIe-based platforms, and a combination thereof. In other examples, a variety of other platform relationships may be used. In particular examples, the universal interconnect module has an upper tier with a pair of spatially separated horizontal rails and a lower tier that is adjacent to the upper tier with at least one pair of spatially separated vertical rails. The result is an interconnect system and receiver for enhancing the organizational and interchangeable electrical engagement between a test adapter and automated testing equipment.

20 Claims, 14 Drawing Sheets

UNIVERSAL PULL-THROUGH RECEIVER

This application claims the benefit of U.S. provisional application No. 61/728,375, filed Nov. 20, 2012, which is incorporated herein by reference in its entirety.

BACKGROUND

Field

The present disclosure relates generally to electrical connectors and, more particularly, to a interconnect system and universal pull-through receiver for enhancing the organizational and interchangeable electrical engagement between a test adapter and automated testing equipment.

Related Art

Mass interconnect systems and devices enhance connectivity and allow for the reduction, or even elimination, of conventional wiring harnesses when testing complex electrical and electromechanical systems. Typically, mass interconnect systems bring many electrical contacts into contact with each other simultaneously to facilitate efficient connection and disconnection of the testing equipment. For instance, mass interconnect systems and devices may eliminate capacitances, signal crosstalk or other attenuational concerns presented by traditional cable-based systems and devices. Further, mass interconnect systems provide higher degrees of stability, which provide for improved system performance and up-time.

Mass interconnect systems often require the placement of interchange test adapters, or similar wiring modules with multiple electrical contacts in operative engagement with opposing co-acting contact of receiver modules. Typically, the receiver contacts and the interchangeable test adapter align with precision, for instance to minimize, or eliminate, wear and/or equipment damage.

Often the mass interconnect systems connect a testing unit to automated testing equipment. For instance, a mass interconnect system may provide electrical connection for a PCI eXtensions for Instrumentations (PXI)-based test system. PXI systems are intended to measure and automate high-performance applications. Typically, PXI systems incorporate standards governed by the PXI Systems Alliance, all of which are hereby incorporated by reference. For instance, PXI may integrate timing and synchronization to rout synchronization clocks and be reprogrammed to match test, measurement and automation demands.

Traditional cable-based automatic test equipment systems and devices often require system calibrations, which take significant time to remove and carry the risk of performance problems once reinstalled. Mass interconnect systems also help lower the cost of integrating and wiring the systems.

Therefore, Applicants desire a mass interconnect system and universal receiver system adapted to interconnect at least one of a variety of instrumentation platforms without the drawbacks presented by the traditional systems and methods.

SUMMARY

In accordance with the present inventions, a universal receiver for a mass interconnect system is provided for receiving an interchangeable test adapter for a mass interconnect device. These inventions provide an improved mass interconnect system and hybrid receiver that is convenient, efficient and safe for the user, particularly when used in operating a variety of test platform systems.

In one embodiment, the disclosure provides a hybrid mass interconnect system that is adapted to support at least one, and in some examples more than one, of a peripheral component interconnect extension for instrumentation (PXI) platform, a local area network extension for instrumentation (LXI) platform, and an advanced extension for instrumentation (AXIe) platform. The system includes a frame, a connection assembly that is secured on the frame, a universal interconnect assembly that is positioned within the frame, and an interchangeable test adapter. The frame typically includes first, second, third and fourth sides, wherein the first and second sides oppose one another, while the third and fourth sides oppose one another. The universal interconnect assembly typically includes a vertical pull-through instrumentation (VPTI) platform and a horizontal pull-through instrumentation (HPTI) platform. Typically, the interchangeable test adapter includes an upper tier and a lower tier which mirror and mate with any of receivers shown and described herein.

In yet another embodiment, a mass interconnect system includes a test adapter and a receiver having a universal interconnect assembly. The interconnect assembly may include a vertical pull-through instrumentation platform that is generally adjacent to a horizontal pull-through instrumentation platform to support a modular test system (MTS) platform. The receiver and the interconnect assembly thereby form an integral structural unit that is generally adapted to mirror and mate with the test adapter.

In some examples, the MTS includes a peripheral component interconnect extension for instrumentation (PXI) platform. In further examples, the MTS includes a local area network extension for instrumentation (LXI) platform. In yet additional examples, the MTS includes an advanced extension for instrumentation (AXIe) platform. In addition, the receiver interconnects instrumentations are chosen from both a PXI platform and LXI platform.

The receiver may also include a frame. In some examples, the universal interconnect assembly is sized and positioned to fit within the frame. In particular examples, the frame includes a first, second, third and fourth sides, the first and second sides opposing one another and the third and fourth sides opposing one another. The adapter may further include an adapter frame having a first, second, third and fourth sides, the first and second sides opposing one another and the third and fourth sides opposing one another, and the first and second sides being substantially perpendicular to the third and fourth sides. The test adapter frame may include roller pins that are generally positioned to align with the universal receiver in a mated position.

In other examples, the adapter is a legacy adapter. The adapter may include a mating face that is generally configured to interface with the universal receiver in an assembled position. Further, the adapter may include a printed circuit board. In some examples, the printed circuit board includes a cable attachment for communication devices chosen from HDMI, Ethernet, DMI, USB, seta signal transmission technology and a combination thereof. The adapter may further include a low insertion force connection assembly. The connection assembly may include slide plates. Cam slots may be positioned within the slide plates and adapted to correspond to opposing roller pins on the adapter. In addition, a handle may be generally adapted to mate the universal receiver and the adapter.

Another aspect of the disclosure is to provide a universal assembly for a mass interconnect receiver. The assembly may include an upper tier having a pair of spatially separated horizontal rails, and at least one vertical interconnect module pulled-through the upper tier and secured on the horizontal rails. Further, the assembly may include a lower tier that is generally adjacent to the upper tier, and has at least one pair of spatially separated vertical rails and at least one horizontal interconnect module pulled-through the lower tier and secured on the vertical rails. Typically, the interconnect modules are chosen to mate with modular test system platforms. In particular examples, the MTS may include a peripheral component interconnect extension for instrumentation module, a local area network extension for instrumentation module, an advanced extension for instrumentation module, a combination thereof, and the like as understood by those skilled in the art having the benefit of this disclosure.

In some examples, the pair of spatially separated horizontal rails may include an upper rail and a lower rail. The upper rail and the lower rail may include a plurality of fastener apertures along the length of the rail to removably space the vertical interconnect modules along the upper tier. Fasteners may protrude through the vertical interconnect module and may be secured in the fastener aperture. The vertical interconnect module may include a direct access kit (DAK). For instance, the DAK may include an interconnect chosen from rigid PCB, a flexible PCB, a rigid wire support, a semi-rigid support, a short run fixed wire support and a combination thereof. Further, the DAK may include a connecting face removable from the horizontal rails. For example, the DAK may include a connecting lip secured on the horizontal rails and a pull-through body extending beyond the module.

In other examples, the lower tier may include two pair of spatially separated vertical rails. The two pair of spatially separated vertical rails may be adjacent to one another. A filler plate may be positioned between the two pair of spatially separated vertical rails. Typically, the pair of spatially separated vertical rails includes at least a left rail and a right rail. The left rail and the right rail may include fastener apertures along the length of the rail to space the horizontal interconnect modules along the lower tier. A fastener may protrude through the vertical interconnect module and be secured in the fastener aperture. The horizontal interconnect module may be a DAK. For instance, the DAK may include an interconnect chosen from rigid PCB, a flexible PCB, a rigid wire support, a semi-rigid support, a short run fixed wire support and a combination thereof. Further, the DAK may include a connecting face removable from the vertical rails. For example, the DAK may include a connecting lip secured on the vertical rails and a pull-through body extending beyond the module.

Another aspect of the disclosure is to provide a universal module for a mass interconnect receiver that includes an upper tier and a lower tier adjacent to the upper tier and having interconnect modules that include a first module from a PXI platform and a module from another LXI platform or a second module from a PXI platform. The upper tier may have a pair of spatially separated horizontal rails and at least one vertical interconnect module that is pulled-through the upper tier. Typically, the interconnect module is secured on the horizontal rails. The lower tier is adjacent to the upper tier and includes at least one pair of spatially separated vertical rails. The lower tier includes at least one horizontal interconnect module that is pulled-through the lower tier. Typically, the interconnect module is secured on the vertical rails.

In another embodiment, a hybrid receiver for a mass interconnect system comprises a frame, a connection assembly and a universal interconnect module within the frame. The frame may have a first, second, third and fourth sides, the first and second sides opposing one another and the third and fourth sides opposing one another. The connection assembly may be secured on the frame to mechanically engage an opposing testing unit. The universal interconnect module may have a vertical pull-through instrumentation platform that is substantially adjacent to a horizontal pull-through instrumentation platform. Typically, the universal interconnect module supports a PXI-based platform and a LXI-based platform.

In some examples, the mass interconnect assembly includes an interchangeable test adapter having an upper tier and a lower tier to mirror and mate with the receiver. The adapter may include an adapter frame having a first, second, third and fourth sides, the first and second sides opposing one another and the third and fourth sides opposing one another and the first and second sides being substantially perpendicular to the third and fourth sides. The test adapter frame may include roller pins positioned to align with the receiver in a mated position. In particular embodiments, the adapter is a legacy adapter. The adapter may include a mating face that is configured to interface with the receiver in an assembled position. Further, the adapter may include a printed circuit board. For example, the printed circuit board may include a cable attachment for communication devices chosen from HDMI, Ethernet, DMI, USB, SATA signal transmission technology and combinations thereof. The adapter may include a low insertion force connection assembly.

In particular examples, the connection assembly includes slide plates. Further, the cam slots may be positioned within the slide plates and are adapted to correspond to opposing roller pins on the adapter. The apparatus may include a handle that is generally adapted to mate the receiver and the adapter. The first and second sides of the receiver frame may be substantially perpendicular to the third and fourth sides. Typically, the hybrid receiver interconnects instrumentations chosen from PXI, LXI and a combination thereof; however, a variety of other similar platform relationships may be used in any of the embodiments shown or described herein.

In yet further embodiments, a mass interconnect system includes a receiver having a frame, a connection assembly, a universal interconnect module, and an interchangeable test adapter. The frame may have a first, second, third and fourth sides, the first and second sides opposing one another and the third and fourth sides opposing one another. The connection assembly may be secured on the frame to mechanically engage an opposing testing unit. The universal interconnect module may include an upper tier having a pair of spatially separated horizontal rails and at least one vertical interconnect module that is pulled-through the upper tier and secured on the horizontal rails. The universal interconnect module may include a lower tier that is adjacent to the upper tier and has at least one pair of spatially separated vertical rails and at least one horizontal interconnect module that is pulled-through the lower tier and secured on the vertical rails.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
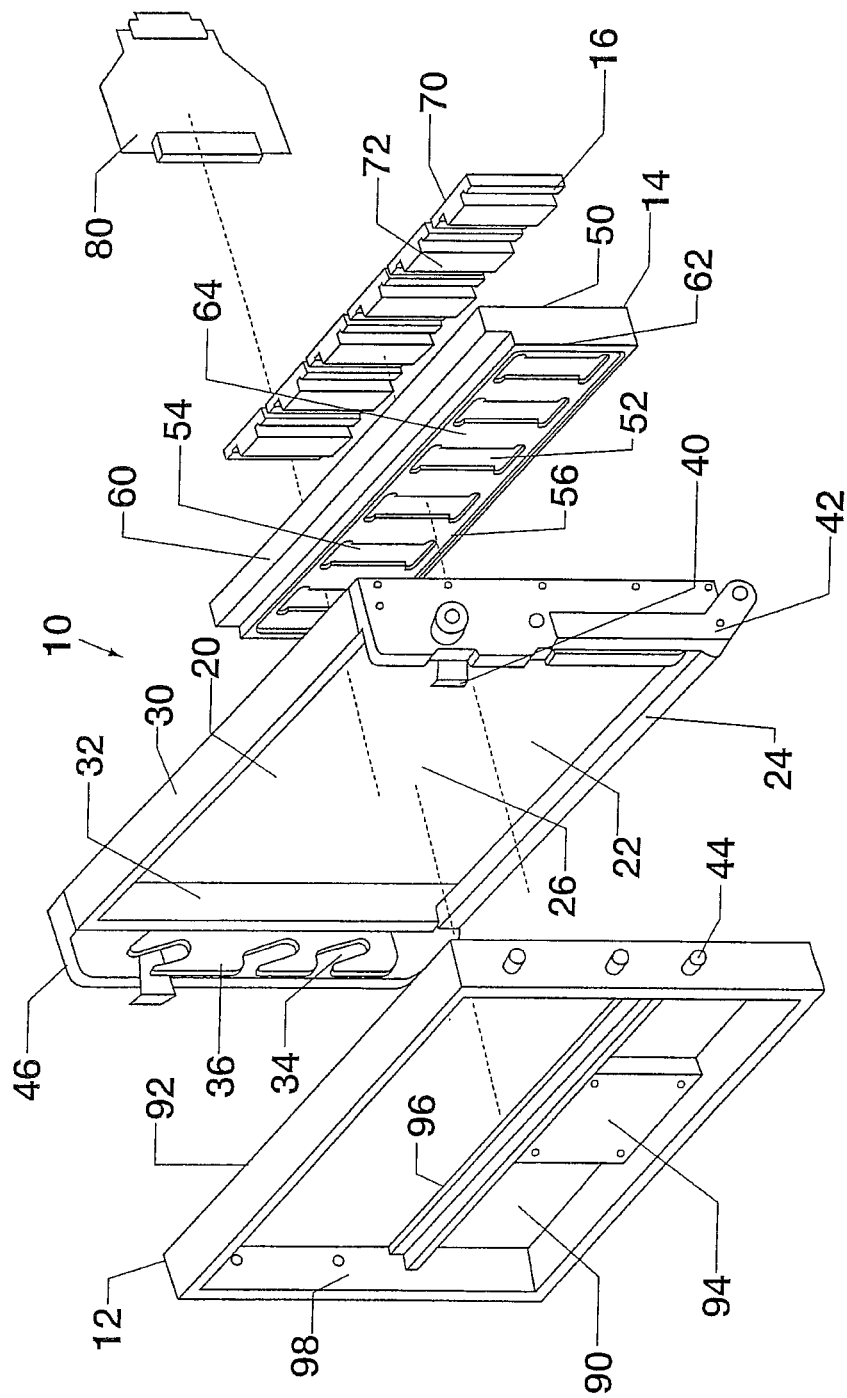
FIG. 1 is an exploded perspective view of a mass interconnect assembly, including a receiver, a test adapter and test fixture interconnect constructed according to one embodiment of the disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 11:
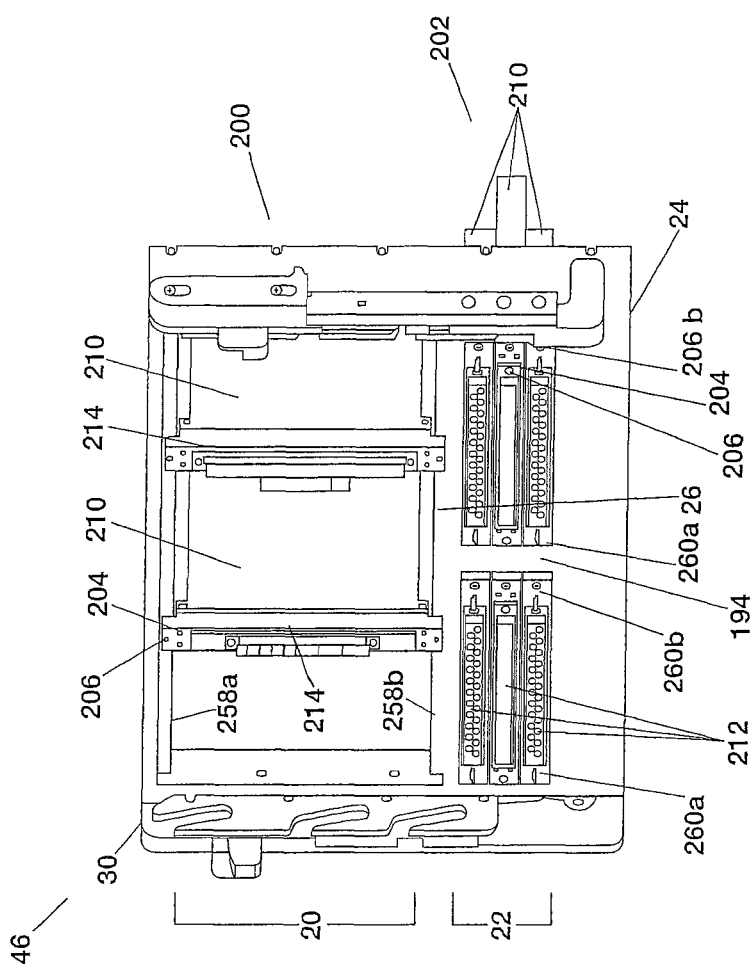
FIG. 11 is an isolated perspective side view of one embodiment of a universal receiver with interconnect modules positioned on the receiver, with elements removed for clarity.

Referring now to the drawings in general and FIG. 11 in particular, it will be understood that the illustrations are for the purpose of describing embodiments of the disclosure and are not intended to limit the disclosure or any inventions thereto. As best seen in FIG. 11, the universal receiver 46 includes an upper tier 20 with a vertical instrumentation platform 200 and a lower tier 22 with a horizontal instrumentation platform 202. The vertical instrumentation platform 200 secures a vertical interconnect module 214 in a variety of configurations, with the pull-through body 210 extending beyond the universal receiver 46. For instance, as shown in FIG. 11, two vertical interconnect modules 214 are pulled through the upper tier's 20 vertical instrumentation platform 200 and are secured on the opposing rails 258a, 258b. Similarly, the horizontal instrumentation platform 202 secures a horizontal interconnect module 212 in a variety of configurations, with the pull-through body 210 extending beyond the universal receiver 46. Typically, the universal receiver 46 mechanically engages with interchangeable test adapter 12 (shown in FIG. 1) for testing of a piece of automated test equipment. Examples of testing platforms include one, and two or more, of PXI-based platforms, LXI-based platforms, and AXIe-based platforms.

Figure 3:
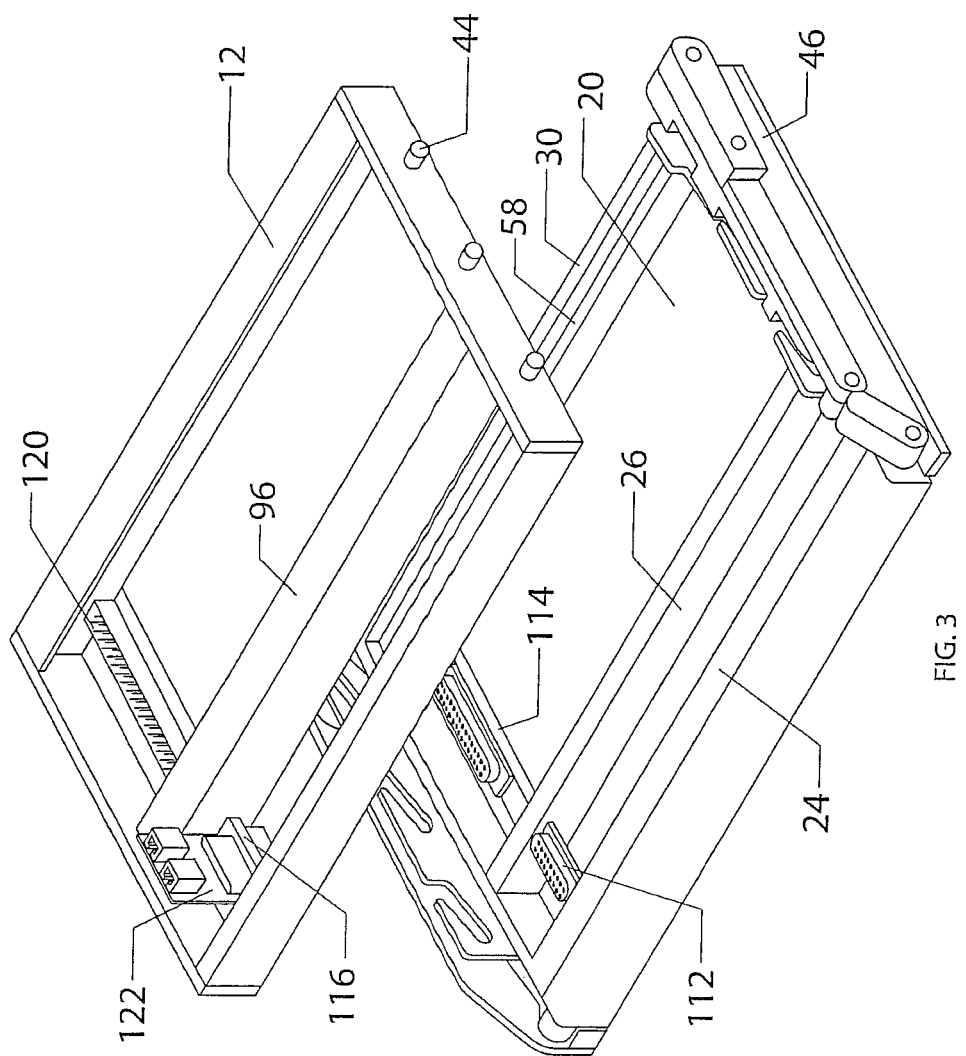
FIG. 3 is a partially exploded view of another mass interconnect assembly embodiment, including a receiver, a test adapter and a plurality of interchangeable connectors.

FIGS. 1 and 3, illustrate a mass interconnect assembly having a flexible receiver assembly 10 and interchangeable test adapter 12 according to embodiments of the present inventions. Flexible receiver assembly 10 may include a receiver 46, a carrier building block assembly 14 and interchangeable connector modules 16, 112 and 114. Typically, the interchangeable connector modules are integrated into the flexible receiver assembly 10 from the rear face of the receiver to reduce, or even eliminate, integration concerns associated with feeding the modules through the front face of the system.

As shown in FIGS. 1 and 3, receiver 46 is configured to provide the sprocket side of the interface with interchangeable test adapter 12 of the general type shown and described in U.S. Pat. No. 4,329,005, U.S. Pat. No. 7,016,199 and U.S. patent application Ser. No. 13/586,249, the contents of which are both incorporated herein by reference. However, it is within the sprit of this disclosure for receiver 46 to be configured in a variety of interchangeable arrangements for mounting to a variety of particular pieces of test equipment. FIG. 1 shows flexible receiver assembly 10 properly aligning the connections of receiver 46 to the connections in the interchangeable test adapter 12 to complete the electrical connection between the mating pin/socket contacts. Generally, interchangeable test adapter 12 is the plug to receiver's 46 sprocket and contains mirroring connection with receiver 46.

Typically, receiver 46 has at least two pairs of opposing outer sides that form a generally rectangular, or square, receiver frame. As depicted in FIGS. 1 and 3, receiver 46 is adapted to be mounted and mated with interchangeable test adapter 12 in a substantially vertical manner, however other embodiments include a modular receiver 46 and such receiver 46 may be positioned in a variety of orientations with respect to the interchangeable test adapter 12. For example, other embodiments may include non-rectangular geometrical receivers, for instance to mate with a variety of interchangeable test adapters, including non-rectangular interchangeable test adapters.

In particular embodiments, receiver assembly 10 includes multiple tiers in receiver 46 to house connection modules between interchangeable test adapter 12 and a piece of automated test equipment, for instance a PXI platform, an LXI platform, and/or an AXIe platform-based instrument. The multiple tiers may be openings that are framed by horizontal and vertical support members. Typically, the receiver assembly's 10 horizontal and vertical support members include outer wall members which define the outer periphery of the receiver to mate with ITA and which support inner rail assemblies. For instance, as illustrated in FIGS. 1 and 3, examples of outer wall members in a two-tiered system include a bottom wall 24, a top wall 30 and a middle wall 26 there between. Therefore, the receiver 46 in these examples have two openings: a lower tier opening 22 and an upper tier opening 20. The spacing of the middle wall 26 between the bottom wall 24 and top wall 30 will vary based upon the dimensions of the various connector modules and interconnects, as discussed herein.

Figure 2:
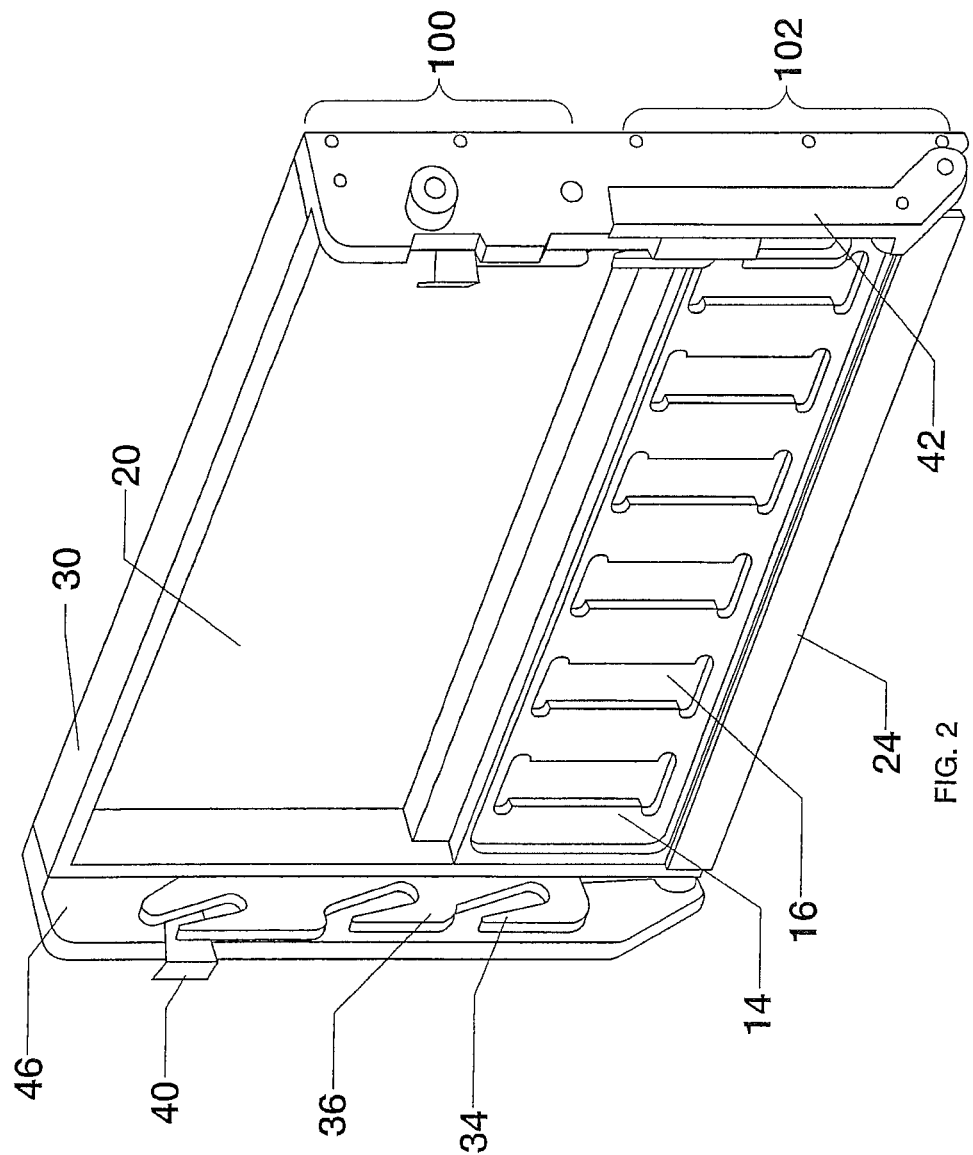
FIG. 2 is a front perspective view of the mass interconnect assembly embodiment of FIG. 1.

As shown in FIGS. 1 and 3, bottom wall 24 and middle wall 26 define lower tier opening 22, which is generally an elongated, rectangular-shaped orifice. Typically, lower tier opening 22 may be sized to receive a variety of receiver assembly 1 elements, for instance interconnect components and/or adjacent carrier building block assembly 14, as an integral unit to be utilized in a variety of configurations. Similarly, middle wall 26 and top wall 30 define upper tier opening 20. While two openings, 22 and 20, are depicted in FIGS. 1 and 2, other embodiments including other arrangements having other numbers of openings, for instance a unitary opening and/or additional rows of openings as discussed later.

FIGS. 1 and 3 further introduce the inner rails along the wall support members to engage the interconnect components and building block assemblies. In some examples, the inner rails may function as an orientation alignment for interchangeably positioning the interconnect components and building block assemblies in a variety of testing configurations and arrangements, while being aligned to mate with their corresponding connections as described herein. As shown in FIGS. 1 and 3, the rail assembly in a two-tier system may include a lower rail 56, an upper rail 58 and an intermediate rail 60 there between. The spacing of the intermediate rail 60 between the lower rail 56 and upper rail 58 will vary depending upon the various connector modules and interconnects discussed herein.

Receiver 46 may have a sliding hanger assembly including a hanger structure and a hanger slide retainer, so that receiver 46 will be flush with the facing surfaces of interchangeable test adapter 12. In some examples, mounted inwardly adjacent to the sliding hanger assembly are left and right slide plates 36. The pair of slide plates may be mounted in any conventional manner so as to slide upwardly and downwardly with respect to the coordinate system of the figures. The motion of the slide plates may be coincident and simultaneous, and for instance, driven by a user. In particular examples, a user may actuate a handle 42. As illustrated in FIGS. 1, 3 and 9, handle 42 may be mounted to one side of receiver 46 and pivot about an axis defined by one end of a torsion shaft, for instance a shaft that runs about the length of receiver 46, for instance as later illustrated in FIG. 8. In some examples, handle 42 may connect two drive linkages, for instance one on each of the left and right sides of receiver 46, as also shown later in FIG. 8.

As shown in FIGS. 1 and 3, each of slide plates 36 may include one or more cam slots 34. Other embodiments include a variety of cam slots 34, for instance to correspond to the number of roller pins 44 positioned on interchangeable test adapter 12 with which receiver 46 is designed to engage. Typically, cam slots 34 are sized to accommodate the interchangeable test adapter 12 roller pins, for instance during upward movement of the slide plates 36. In some examples, cam slots 34 engage roller pins 44 to cause the interchangeable test adapter 12 to move inwardly, for example into engagement with receiver 46. Typically, the electrical contacts carried by the interchangeable test adapter 12 are thereby brought into engagement with the corresponding electrical contacts carried on receiver 46. Similarly, downward movement of slide plates 35 may trigger interchangeable test adapter 12 to move outwardly to disengage electrical contacts carried by the interchangeable test adapter 12 with electrical contacts carried by receiver 46.

Figure 8:
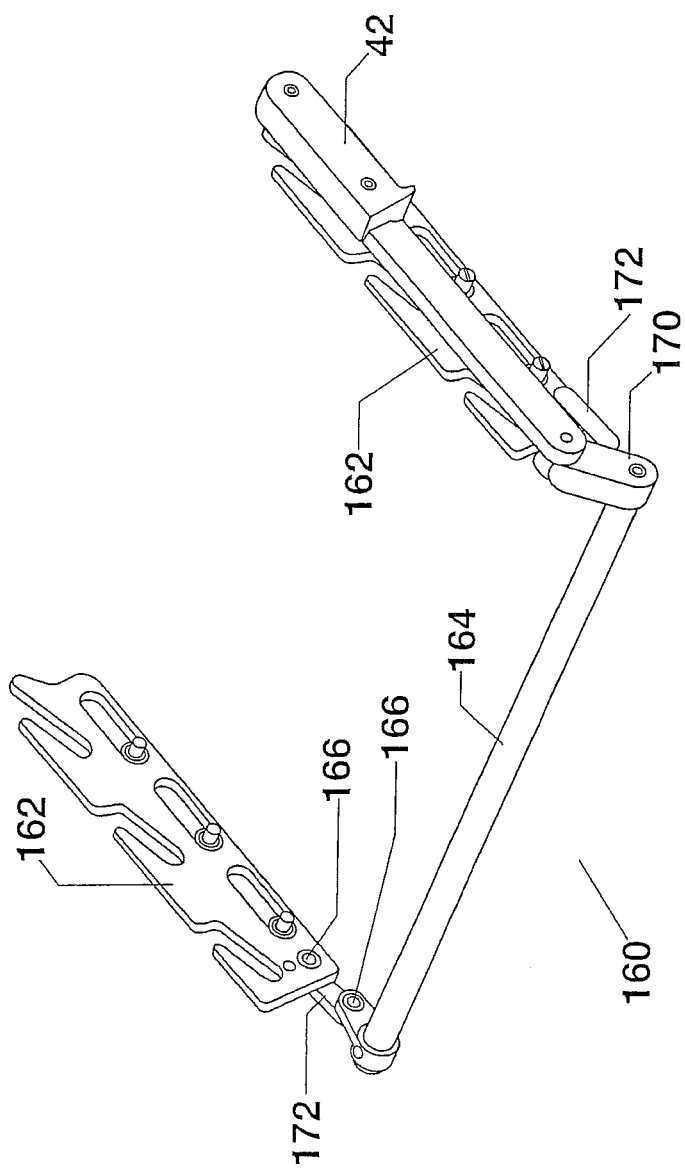
FIG. 8 is an isolated perspective side view of a linkage assembly in the receiver according to one embodiment of the disclosure, with elements omitted for clarity.
Figure 9:
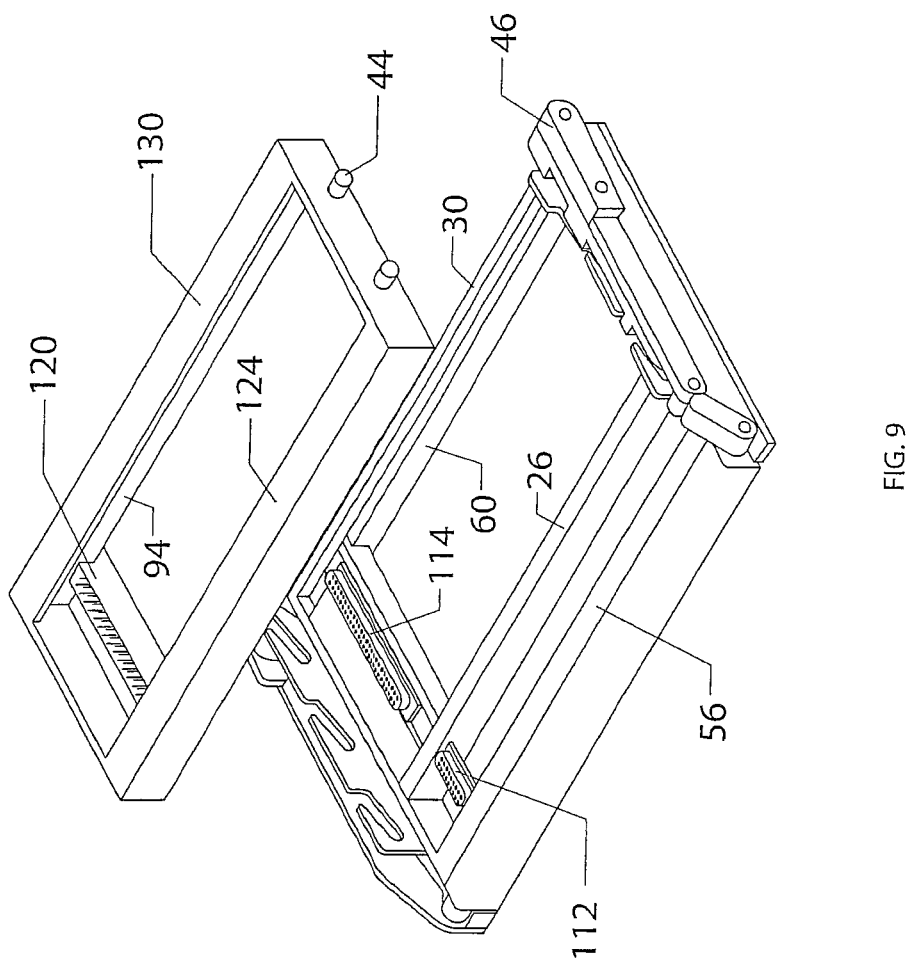
FIG. 9 is partially exploded front perspective view a further embodiment of a mass interconnect assembly, including a single tier test adapter.

Turning to FIG. 8, a modular linkage assembly 160 may enhance engagement of the receiver 46 with the ITA 12. The modular linkage assembly includes a torsion shaft 164 between opposing vertical sides 162 of receiver 46. As shown, a pair of opposing drive linkages 170, 172 on either the left, right or both sides of the receiver may connect the handle 42 and drive movement of the torsion shaft 164. Bearings 166, for instance needle bearings or the like, may be positioned at friction points along the modular linkage assembly to reduce, or even eliminate, galling or seizing. In these examples, the bearings 166 improve the life of the system, as well as provide significant improved feel for the operator when engaging, disengaging the receiver and ITA.

Returning to FIGS. 1 and 3, the lower tier opening 22 may house a variety of interconnect devices that mate with corresponding connections on the ITA. In one embodiment, as illustrated in FIGS. 1 and 2, a substantially permanent adjacent carrier building blocks 14 may mount different types of contacts, for example, contacts that carry electrical power or electrical signals, or contacts of different construction. Adjacent carrier building blocks 14 may define an integral system that is sized to accept and retain a plurality of connector modules to engage electrical contacts carried by the interchangeable test adapter 12 and receiver assembly 10, as described below.

As shown in FIG. 1, adjacent carrier building blocks 14 may include a lower rail 56 and an upper rail 58 that define a chassis side 50. Typically, the chassis side 50 may electrically engage connections in communications with testing equipment, for instance to a PXI. On the opposing side of the building block assembly is a mating side 52 to electrically engage the interchangeable test adapter 12. In some examples, this arrangement is in a substantially fixed position. For instance, adjacent carrier building blocks 14 may be securely positioned within lower tier opening 22 in a substantially fixed position to allow modularity of electrical contacts corresponding to a variety of electrical contacts of interchangeable test adapter 12. Further, carrier building blocks 14 may include adapter openings 54 that are sized in a substantially fixed position, so as to secure adjacent connect modules 16 in a variety of configurations.

Figure 4:
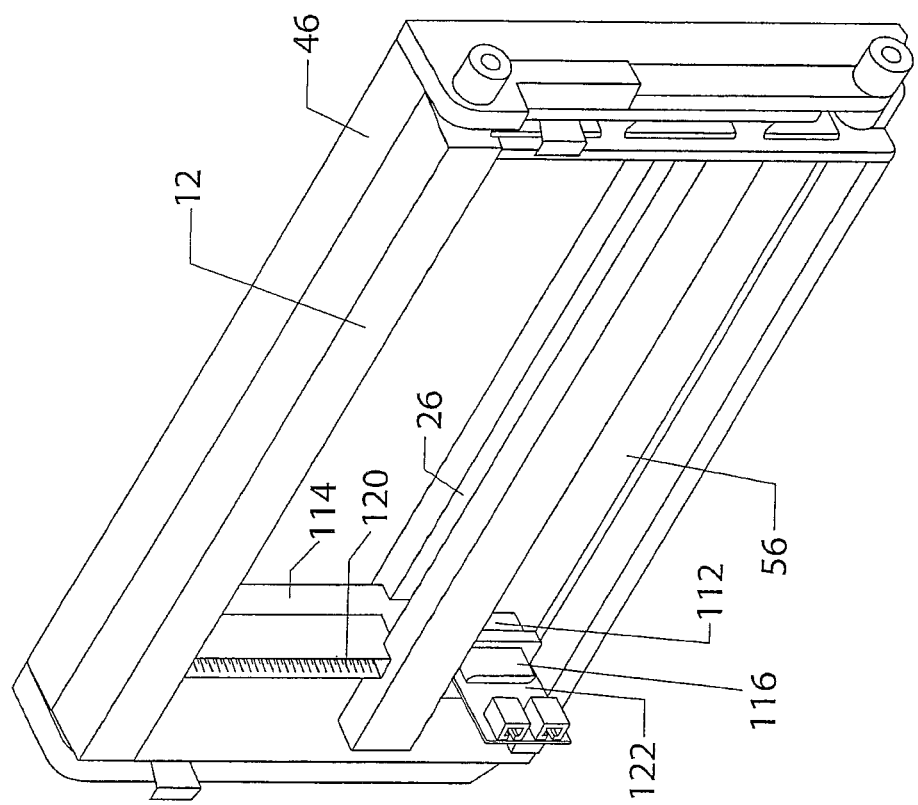
FIG. 4 is a side perspective view of the mass interconnect assembly embodiment of FIG. 3.

In yet other embodiments, as illustrated in FIGS. 3 and 4, the receiver 46 may include an interchangeable infrastructure to support a variety of connector module arrangements to mate with their corresponding connections as described herein. For instance, as shown in FIG. 3, the rail assembly allows convenient integration and interchange of interconnect modules 112 and 114, for example from the rear face of the assembly, to mate with ITA modules 116 and 120. Typically, the upper tier includes a rail system between the bottom wall and the middle wall, wherein interconnect modules 112 may be secured from the rear face of the receiver and mate with the corresponding ITA module. Similarly, in a two-tier system as shown, the upper tier may include a rail system within the boundary of the top wall and middle wall to secure interconnect modules 114 to mate with the corresponding ITA module. Again, the interconnect modules 114 may be integrated in the system from the rear face to minimize, or eliminate, the concerns associated with feeding the system through the testing assembly and/or to reducing tooling and integration expertise.

The adjacent connector modules 16 and interconnect modules 112 and 114 may house a variety of electrical contacts and typically include a wiring side 70 and a mating side 72. Connector modules 16 and interconnect modules 112 and 114 may be made from a variety of materials depending on the desired electrical characteristics. For instance, connector modules 16 may be comprised of NEMA Grade Epoxy Glass G-10 to provide enhanced electrical isolation values.

Further, as shown in FIGS. 1 and 3, adjacent connector modules 16 and interconnect modules 112 and 114 may include a wiring face 70 to carry either a digital or an analog signal. In some examples, the frequency range may be DC up to about forty gigahertz. Further, the current can be up to about fifty amps. In other embodiments, a thermocouple, vacuum and/or pneumatic may be included to complete the connection with connector modules 16. However, as shown in FIGS. 1 and 3, adjacent connector modules 16 and interconnect modules 112 and 114 are typically sized to include electrical contacts to mate with the ITA modules and/or engage the electrical contacts carried by a test fixture interconnect 80.

FIG. 2 shows a perspective view of one embodiment of a receiver assembly 10 introduced in FIG. 1, with upper tier 100 and lower tier 102 in an assembled position. As illustrated, lower tier 102 may include connector modules 16 providing high and low density I/O connectors embedded in adjacent carrier building blocks 14 within the lower tier opening. From a rear perspective of this embodiment, the connector modules 16 may support a variety of electrical connection configurations. For instance, a plurality of connector modules 16 may include split line connectors to indicate at least two connectors on wiring side 70. Other embodiments include a variety of connector and connector module 16 configurations as discussed below.

In one example of the assembled position, the mating side of connector modules 16 is positioned between adjacent carrier building blocks 14, for example in a specific configuration to match a particular piece of testing equipment. A filler plate 94 may be included to block and protect elements of receiver assembly 10, for instance unused connections in connector modules 16. In such a mass interconnect system embodiment a PXI instrument may be attached to a receiver connector module, for instance through a direct access kit (DAK) adapter. The DAK adapter may provide direct connectivity between the PXI instrument and the receiver connector module. Typically, the instruments may be installed and/or removed though the front face of the receiver connector module. Unlike this DAK assembly, traditional cable-based ATE systems and devices often require system calibrations that take significant time to remove and carry the risk of performance problems once reinstalled.

As shown in the partially assembled position in FIG. 2, one embodiment of receiver assembly 10 connects with a test fixture interconnect 80 on the wiring side 70 of connector modules 16. Test fixture interconnect 80 may include several thousand connections in a single engagement with connector module 16. In particular examples, test fixture interconnect 80 may include Flex connectors, PC boards and pre-configured patch cords.

FIG. 4 shows another embodiment of a receiver assembly 10 introduced in FIG. 3, with an upper tier and lower tier in an assembled position. As illustrated, the lower tier may include at least one interchangeable connection module 112 integrated on the receiver 46 and mated with a corresponding ITA connection adapter module 116. Again, the connection module may provide high density I/O connections. As shown, the receiver assembly provides contact pins to incorporate small connectors with both large interchange assemblies and other smaller mass interconnect systems, thus reducing spares, inventory, tooling demands, and other wire cramping, etc. concerns. In particular examples, the ITA connection adapter module 116 may include a printed circuit board assembly 122 or the like for improved user connections as discussed hereinafter. Further, as shown in FIG. 4, the upper tier may include at least one upper interchangeable connection module 114 to generally mate with a corresponding ITA connection adapter module 120. While FIGS. 3 and 4 illustrate only one connection module on the upper and lower tiers, the inventions herein provide convenient infrastructure for a variety of connection module arrangements to meet a variety of mass interconnect demands.

Figure 5:
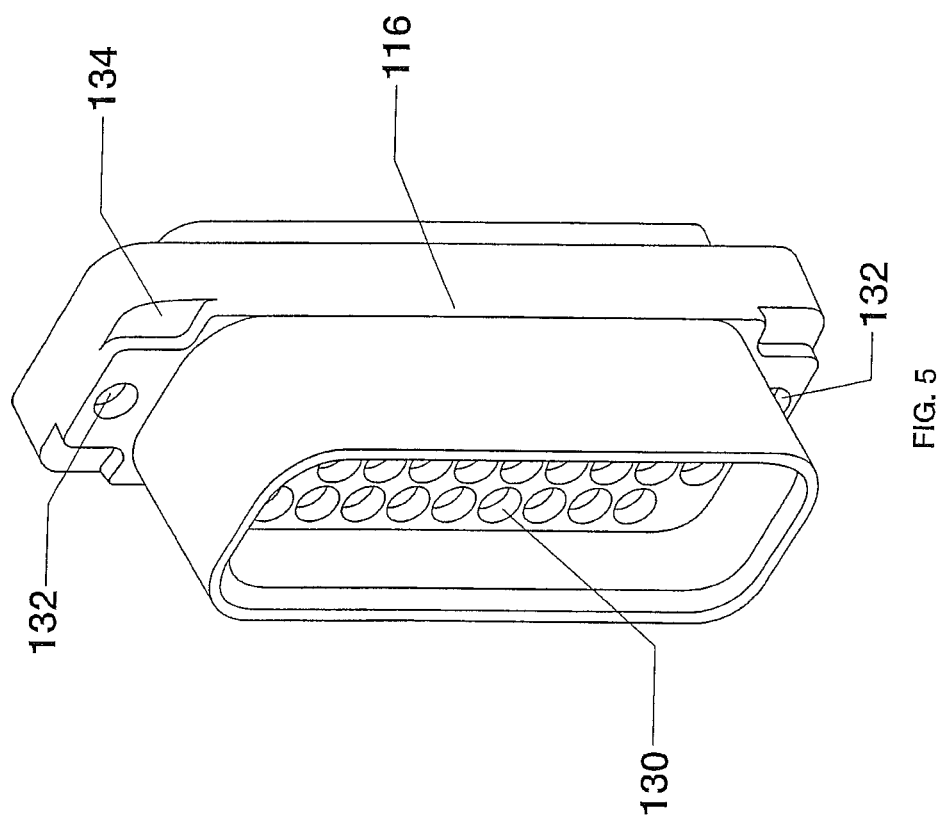
FIG. 5 is an isolated perspective front view of one embodiment of an interchangeable adapter connector introduced in FIG. 3, with elements omitted for clarity.

FIG. 5 shows an isolated view of one embodiment of an ITA connection module introduced in FIGS. 3 and 4. Typically, the ITA connection adapter module 116 includes a body to support an engagement lip to mate with an upper or lower interchangeable connection module 112,114, as well as housing for contact points 130. As shown, the upper and/or lower ends of the body may include apertures to receive fasteners to secure the ITA connection module with the opposing connection element. Further, as illustrated, location tabs 134 on the back side of the body allow the user to easily plug the element into place with fasteners through apertures 132, or similar securing procedure recognized by those skilled in the art.

Figure 6:
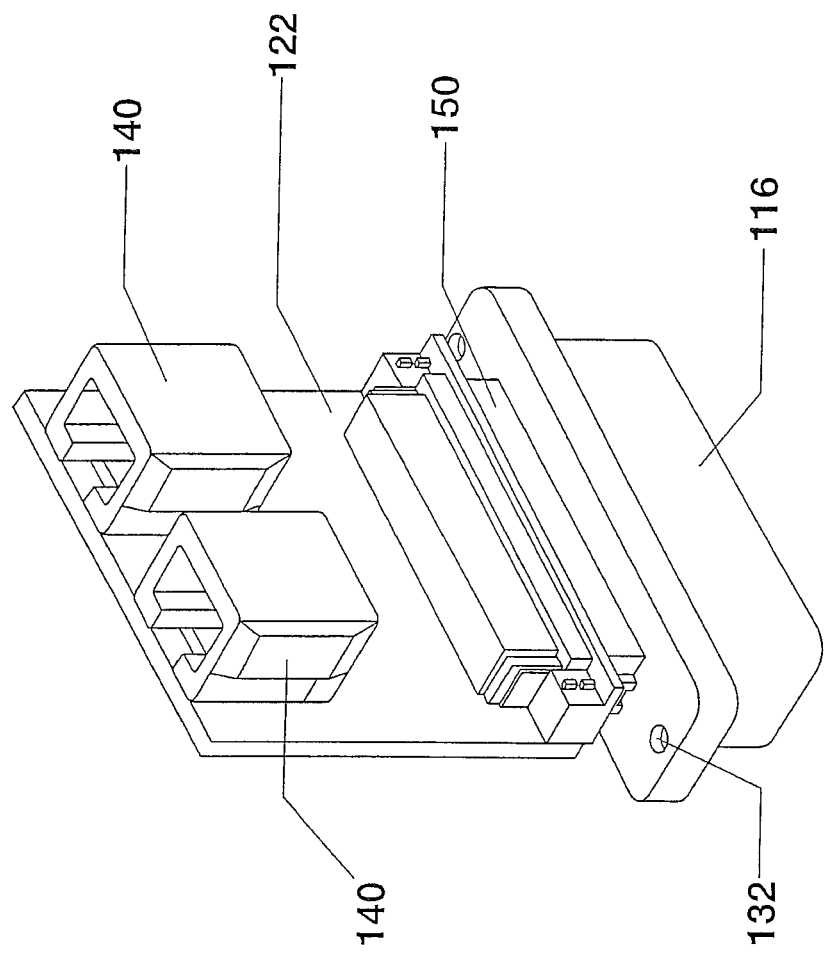
FIG. 6 is an isolated perspective side view of one embodiment of an adapter connector with a printed circuit board as introduced in FIG. 3, with elements omitted for clarity.

FIG. 6 shows an isolated view of one example of the ITA connection adapter module with a printed circuit board assembly 122 introduced in FIGS. 3 and 4. Typically, a signal element body 150 may be secured to the connection adapter module 116 and generally support the printed circuitry board assembly. As shown, particular examples of the printed circuit board assembly 122 may include HDMI, or similar connections 140. For instance, the printed circuit board may allow connection of HDMI, Ethernet, DMI, USB, seta signal transmission technology and the like, to interplay with the mass interconnect assembly. Such an arrangement significantly improves the interaction of the devices and minimizes the time for integration without the demands and concerns of traditional wiring systems. For instance, standard off-the-shelf cable products may be quickly and easily utilized in the connection 140, thereby minimizing the integration demands and/or skill level required for testing set-up.

Figure 7:
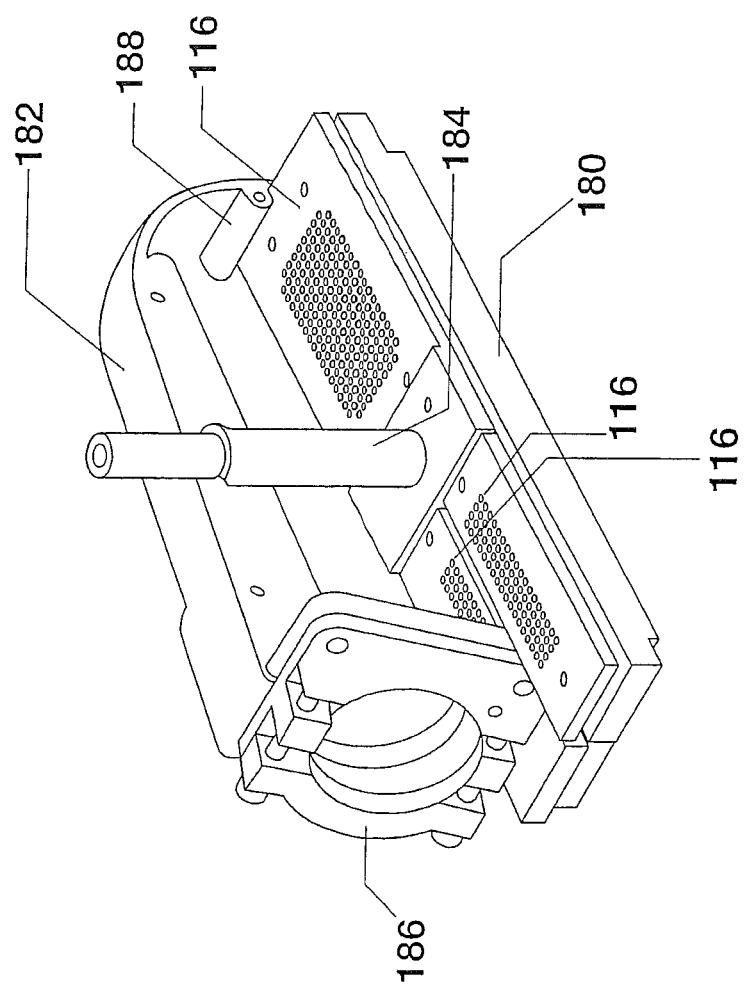
FIG. 7 is an isolated perspective side view of an adapter module according to yet another embodiment of the disclosure, with elements omitted for clarity.

FIG. 7 shows another embodiment of connection adapter module 116 having a low insertion force connection 180 that may be used in any of the flexible receiver assembly inventions described herein. For instance, a LIF connector may provide pin and socket connections, for instance for a more rugged connection alternative. Further, LIF embodiments may be advantageous where service requires frequent connects/disconnects. Some examples of LIF include 96, 156 and 260 contact configuration. Typically, LIF connectors are mounted by rotating the mechanism, for example about one hundred and eighty degrees, to engage the LIF mating half. The connector may include a LIF plug 184 affixed to the ITA connector adapter modules 116. A shell 182 may enclose the connections with only the LIF plug protruding through the shell 182. FIG. 7 illustrates a partial shell to show internal components. Further, the shell 182 may be hinged 188, or the like, and include fasteners, for instance attachment 186 as shown in FIG. 7 and the like as recognized by those skilled in the art.

Other embodiments of LIF include a polarizing LIF to provide a unique identity to each connector. A variety of embodiments of LIF plug connectors may be incorporated into the mass interconnect assembly. For instance, a 156 position LIF plug may be used for discrete wiring. Further, hybrid LIF plug with 15 signal positions for instance 16 coax/power, may be incorporated into the system. Still further, a hybrid LIF plug with 72 signal positions for instance 18 coax/power may be incorporated into the system.

A variety of LIF sockets may be used in any of the inventions herein. For instance, a PCB socket may provide enhanced interconnection for rugged system for discrete wiring. Additionally, hybrid sockets that provide a 96 position LIF socket for discrete wiring; hybrid LIF socket for 16 signal positions, for instance having 16 coax/power; and/or hybrid LIF socket with 72 signal positions, for instance having 18 coax/power may be incorporated by any of the inventions shown and described herein.

In yet other examples, receiver coax elements may be incorporated into the inventions described herein. For instance, a 152 position coax module; a 59 position coax module; a 9 position hi-frequency coax module, for instance a 9 position module for SMA; a 12 position hi-frequency, 40 gigahertz module; an 18 position hi-frequency coax module rated for about 50/75 ohms; a 24 position mini-coax module; a 6 position triax module; and/or a 32 position coax module rated for about 50/75 ohms may be incorporated by any of the inventions shown and described herein.

Still further examples may include a variety of receiver power elements. For instance, a 152 position power module; a 24 position power module; and/or a 59 position power module may be incorporated by any of the inventions shown and described herein.

Additional examples include a variety of receiver signal elements. For instance, a mounting side and a wiring side of a 160 position DIN signal module; a 96 position HDI/DIN signal module; a 200 position HDI signal module; and/or a 96 position discrete signal module may be incorporated by any of the inventions described herein.

As introduced above, hybrid elements of certain embodiments of connector modules may be incorporated by any of the inventions described herein. For instance, a hybrid pneumatic plus 24 signal module may be incorporated by any of the inventions shown and described herein.

FIG. 9 shows anther embodiment of the mass interconnect assembly introduced above, wherein the ITA includes only a single tier to mate with any of the receiver embodiments shown or described herein. In this embodiment, an ITA connection module 120 may span the entire distance between the upper wall 120 and lower wall 124 and mate with the corresponding receiver connection module. This ITA embodiment may include any of the features and elements shown and described above.

Returning to FIGS. 1 and 3, interchangeable test adapter 12 generally engages with the corresponding contacts of the connector modules 16 carried by receiver assembly 10. In particular embodiments, interchangeable test adapter 12 includes predetermined numbers of replaceable modules having various arrays of electrical contacts thereon requiring engagement with the co-acting contacts carried by receiver assembly 10. As shown, interchangeable test adapter 12 may include left and right sides and a set of locking members, for instance roller pins 44.

In some examples, roller pins 44 have a set of adjacent, independently moveable roller sleeves. The receiver assembly 10 may be fully engaged with interchangeable test adapter 12 such that electrical contacts carried by interchangeable test adapter 12 are fully engaged with electrical contacts carried by receiver 46. In some examples, interchangeable test adapter 12 abuts receiver 46 to form a moisture-resistant seal. In other embodiments, an enclosure encases the interchangeable test adapter 12. The enclosure may include electromagnetic shielding. Further, the enclosure may include a hinged door or a removable face.

In other embodiments, the disclosure includes a mass interconnect kit. In such an embodiment, the kit may comprise a receiver, e.g. any of the receiver elements and components previously shown or described. Further, other embodiments of the kit may comprise an ITA, e.g. any of the ITA elements and components previously shown or described. In this respect, a receiver assembly 10 may be built on a bench, so that any of the elements or components described herein may be 'built-up' prior to installing the system as discussed above.

Building the assembly on a bench may allow for 360 degree access, for instance to load connectors from the back side. Therefore the harness may be built-up for a desired testing sequence, without having to feed the assembly through the interface into the system. This improves integration time, minimizes tooling and related expertise requirements and reduces potential damages associated with feeding the assembly into the system after it is built. The result is a mass interconnect tool kit that operates in different mechanics, and is interchangeable with existing contacts by incorporating small connectors to utilize in larger connection packages.

In further use of some embodiments of the disclosure, the receiver assembly 10 of the flexible mass interconnect system may provide a PCB or short wire interconnection to the test system, for instance a PXI-based test system. For instance, the PXI instrument may be attached to receiver assembly 10, i.e. connector module 16 housed in adjacent carrier building blocks 14 of receiver 46, to provide direct connectivity between the PXI instrument, or similar testing equipment, and the receiver assembly 10. The receiver assembly 10 of the flexible mass interconnect system may be easily installed and removed without disturbing the system wiring.

Figure 10A:
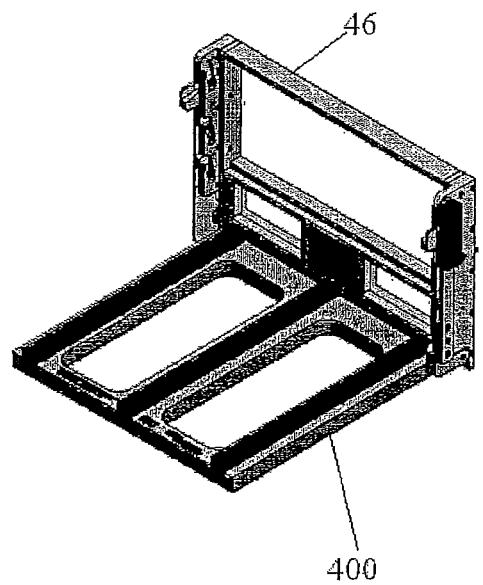
FIGS. 10a and 10b are perspective views of a receiver assembly embodiment with a work shelf.
Figure 10B:
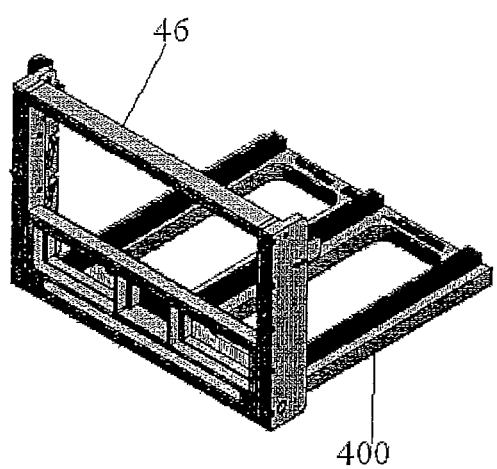

FIGS. 10a and 10b illustrate one example of a receiver assembly 46, e.g. any of the receiver elements and components previously shown or described, with a work shelf 400. Typically, the work shelf 400 is releasably connected to the receiver assembly 46 and includes a work surface to support connection elements previously shown or described.

FIG. 11 illustrates an embodiment of the universal receiver 46 with vertical interconnect modules 214 and horizontal interconnect modules 212 in close proximity to one another support a variety of instrumentation platforms. Examples of platforms include one, and two or more, of PXI-based platforms, LXI-based platforms, and AXIe-based platforms. As shown, the receiver 46 includes an outer periphery frame, which includes, inter alia, a top wall 30, a bottom wall 24 and an intermediary wall 26. The receiver 46 is illustrated as generally rectangular, but those of ordinary skill in the art having the benefit of this disclosure would appreciate that other examples include non-rectangular shapes to meet a particular interconnect application, for instance to mate with a variety of interchangeable test adapters, including non-rectangular interchangeable test adapters.

The frame assembly generally spaces the receiver 46 into an upper tier 20 and a lower tier 22 to house connection modules in close proximity, inter alia adjacent proximity for ease of installation, accessibility and the like, between interchangeable test adapter 12 and multiple pieces of automated testing equipment. As illustrated in FIG. 11, the two-tiered system includes a bottom wall 24, a top wall 30 and a middle wall 26 there between. The spacing of the middle wall 26 between the bottom wall 24 and top wall 30 will vary based upon the dimensions of the various connector modules, e.g. the vertical interconnect modules 214 and horizontal interconnect modules 212, as discussed herein.

The receiver 46 further includes a variety of rail supports to space and retain the interconnection modules in a plurality of configurations. Typically, the vertical instrumentation platform 200 includes a pair of opposing horizontal rails. As shown in FIG. 11, the vertical instrumentation platform 200 may include an upper rail 258a and a lower rail 258b. The spacing of the 258a and a lower rail 258b will vary based upon the dimensions of the various vertical interconnect modules 214, or the like. Similarly, the horizontal instrumentation platform 202 typically includes at least one pair of opposing vertical rails. As shown in FIG. 11, the horizontal instrumentation platform 202 includes two pair of opposing vertical rails. A filler plate 194 may be positioned between the pair of opposing vertical rails in the horizontal instrument platform 202. The two pair of opposing vertical rails may each include a left rail 260a and a right rail 260b. Those of ordinary skill in the art will recognize the left and right, as well as the upper and lower, orientations as discussed herein may be reversed.

FIG. 11 further shows a variety of interconnect modules to provide a connection between an interchangeable test adapter 12 and a piece of automated test equipment. Typically, the interconnect modules are positioned in the universal assembly for the mass interconnect receiver. In particular examples, the automated test equipment includes a PXI instrument platform, a LXI instrument platform, an AXIe instrument platform, and a combination thereof. Embodiments incorporating the PXI instrument platform include a variety of PXI-based technologies, including any of the industry standards governed by the PXI Systems Alliance (PXISA), those of which are hereby incorporated by reference in their entireties. Further embodiments incorporating LXI instrument platform instrumentation includes any of the technologies and industry standards governed by the LXI Consortium, those of which are hereby incorporated by reference in their entireties. Additional embodiments incorporating AXIe-based platform instrumentation includes any of the technologies and industry standards governed by the AXIe consortium and AXIe-based instrumentation as understood by those skilled in the art having the benefit of this disclosure.

The interconnect modules include a connecting face 204 which is generally positioned on the front of the universal receiver 46 and has a pull-through body 210 extending beyond, including behind, the universal receiver 46, i.e. the front face of the receiver. Therefore, Applicants have unexpectedly discovered the organizational and interchangeable advantages of having vertical and horizontal modules in close proximity to one another to provide platforms for PXI, LXI, and/or AXIe instrumentation platforms for improved electrical engagement between a test adapter and automated testing equipment. As shown in FIG. 11, two vertical interconnect modules 214 are pulled through the upper tier's 20 vertical instrumentation platform 200 and are secured on the opposing rails 258a, 258b. Fasteners 206 may protrude through the connecting face 204 of the vertical interconnect modules 214 and be retained in the fastener apertures in the opposing rails 258a, 258b. Therefore, the vertical instrumentation platform 200 is configured to support a variety of mass interconnect devices, including direct access kits (DAKs), as described and shown herein for PXI, LXI, and/or AXIe instrumentation platforms. For instance, the DAK may include a mating face, i.e. a connecting lip on the connecting face 204, that is generally removably secured to the opposing rails 258a, 258b, while allowing the DAK to be pulled through the receiver 46 having the pull-through body extending beyond the universal assembly of the receiver 46.

As also shown in FIG. 11, a plurality of horizontal interconnect modules 212 are pulled through the lower tier's 22 vertical instrumentation platform 202 and secured on the opposing rails 260a, 260b. Fasteners 206 may protrude through the connecting face 204 of the horizontal interconnect modules 214 and be retained in the fastener apertures in both sets of the opposing rails 260a, 260b. Therefore, the horizontal instrumentation platform 202 is configured to support a variety of mass interconnect devices, including DAKs, as discussed herein for both PXI, LXI, and AXIe-based systems. Any of the DAK embodiments described herein may include an interconnect chosen from rigid PCB, a flexible PCB, a rigid wire support or semi-rigid support, a short run fixed wire support, a combination thereof, and the like. Regardless of the removable DAK assembly, the module will typically include a mating face, i.e. a connecting lip on the connecting face 204, that is generally removably secured to the opposing rails 260a, 260b in a variety of configurations along the lengths, while allowing the DAK to be selectively positioned on the receiver 46 with its pull-through body extending beyond the universal assembly of the receiver 46.

Figure 12:
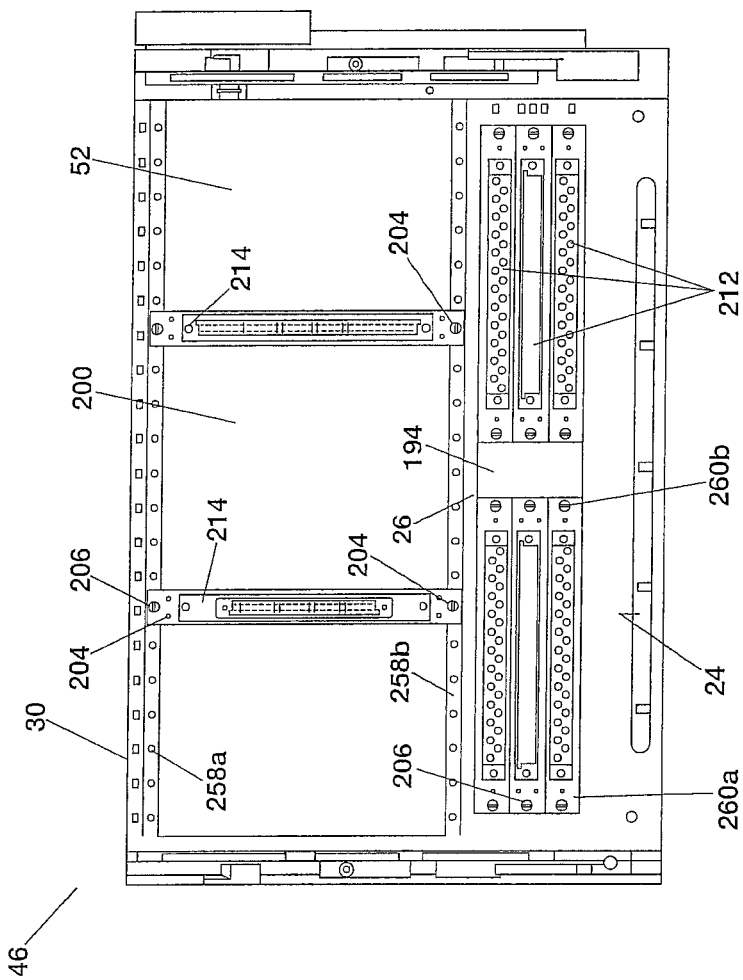
FIG. 12 is an isolated front view of the universal receiver in FIG. 11.

FIG. 12 shows the mating side 52 of a universal receiver 46 embodiment capable of retaining a plurality of vertical and horizontal DAK modules. The upper tier includes the upper rail 258a and the lower rail 258b, which spaces the vertical interconnect modules 214, e.g. any of the modules described and shown herein. The lower tier includes a pair of left rails 260a and right rails 260b to space the horizontal interconnect modules 212, e.g. any of the modules described and shown herein. The intermediate middle wall 26 generally divides the upper tier and lower tier. Similarly, the filler plate 194 generally divides the pair of left 260a and right rails 260b in the horizontal instrumentation platform that is housed in the lower tier. Other examples include no filler plate and/or horizontal modules extending the length of the receiver, i.e. a single opening in the horizontal instrumentation platform 202; while other examples include multiple filler plates 194 to generally separate the instrumentation platforms into a variety of openings.

Figure 13:
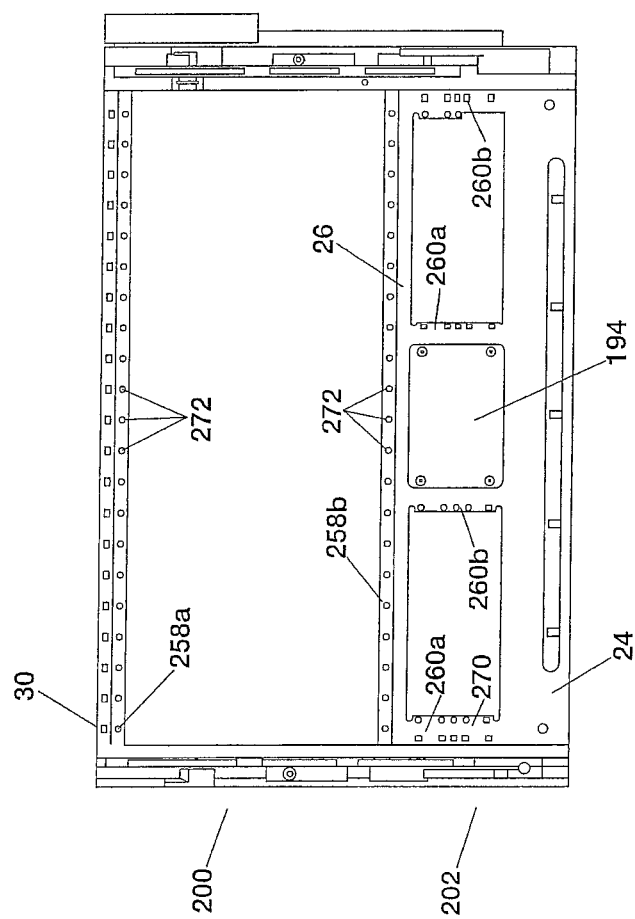
FIG. 13 is an isolated front view of one embodiment of a universal receiver, with elements removed for clarity.

FIG. 13 shows the universal receiver 46 with the vertical and horizontal modules removed. As illustrated, the upper rail 258a and the lower rail 258b include a variety of fastener apertures 272 along the length of the rails to generally space and secure the vertical DAK modules in a variety of predetermined position to match and mate with corresponding testing equipment. In particular examples, the fastener apertures 272 are spaced along the entire length of the upper rail 258a and the lower rail 258b. Further, each of the left rails 260a and right rails 260b include a variety of fastener apertures 270 along the length of the rails to generally space and secure the horizontal DAK modules in a variety of predetermined position to match and mate with a corresponding piece of testing equipment. In particular examples, the fastener apertures 270 are spaced along the entire length of each of the left rails 260a and right rails 260b. Therefore, the receiver is further universal because the fastener apertures along the various rails provide a plurality of spacing arrangement options to match and mate with a variety of testing equipment configurations.

Figure 14:
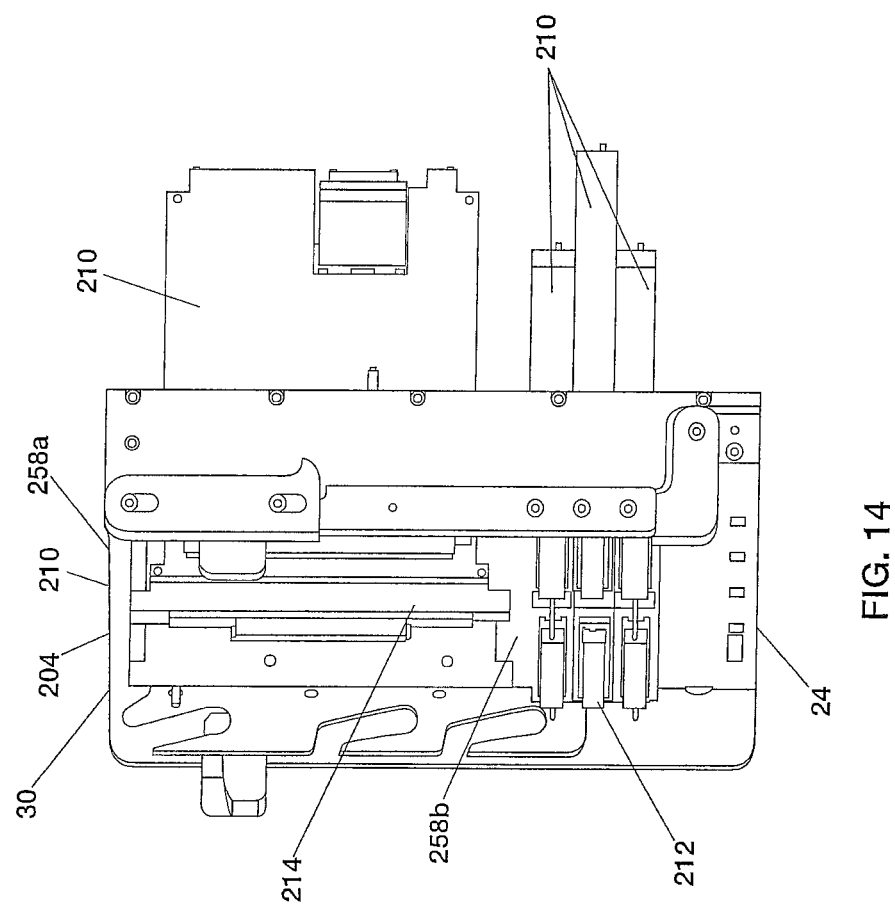
FIG. 14, is an isolated perspective side view of the universal receiver in FIG. 11.

FIG. 14 generally shows the vertical and horizontal pull through bodies 210 extending beyond the front face, including the vertical instrumentation platform 200 and the horizontal instrumentation platform 202, of the universal receiver 46. In particular examples, the vertical and horizontal pull through module bodies are DAKs.

In yet further embodiments, any of the assemblies shown and described herein may be electronically engaged to instrumentation for enhancing the organizational and interchangeable electrical engagement between a test adapter and automated testing equipment. In particular examples, the system includes a LXI-based instrumentation, PXI-based instrumentation, an AXIe-based instrumentation and a combination thereof. In this way, embodiments and examples herein unexpectedly enhance connectivity to a wide variety of platforms not yet recognized by those skilled in the art, while allowing for the reduction of complex conventional wiring assemblies.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

We claim:

1. A mass interconnect system comprising:
   (a) a test adapter; and
   (b) a receiver having a universal interconnect assembly and a modular linkage assembly having needle bearings at friction points to engage said test adapter, said interconnect assembly including a vertical pull-through instrumentation (VPTI) platform adjacent to a horizontal pull-through instrumentation (HPTI) platform to support connectivity to a modular test system (MTS) platform,
      wherein said receiver and said interconnect assembly form an integral structural unit adapted to mirror and mate with said test adapter.

2. The apparatus of claim 1, wherein said MTS includes a peripheral component interconnect extension for instrumentation (PXI) platform.

3. The apparatus of claim 1, wherein said MTS includes a local area network extension for instrumentation (LXI) platform.

4. The apparatus of claim 1, wherein said MTS includes an advanced extension for instrumentation (AXIe) platform.

5. The apparatus of claim 1, wherein said receiver interconnects instrumentations chosen from a PXI platform and LXI platform.

6. The apparatus of claim 1, wherein said receiver further includes a frame.

7. The apparatus of claim 6, wherein said universal interconnect assembly being positioned within said frame.

8. A universal assembly for a mass interconnect receiver, said assembly comprising:
   (a) an upper tier having a pair of spatially separated horizontal rails and at least one vertical peripheral component interconnect extension for instrumentation (PXI) module pulled-through said upper tier and secured on said horizontal rails; and
   (b) a lower tier adjacent to said upper tier and having at least one pair of spatially separated vertical rails and at least one horizontal local area network extension for instrumentation (LXI) module pulled-through said lower tier and secured on said vertical rails, and
      wherein said assembly includes a modular linkage assembly having needle bearings at friction points to engage a test adapter and said interconnect modules are adapted to mate with a plurality of modular test system (MTS) platforms consisting of a peripheral component interconnect extension for instrumentation (PXI) module, a local area network extension for instrumentation (LXI) module, and an advanced extension for instrumentation (AXIe) module.

9. The assembly of claim 8, wherein said pair of spatially separated horizontal rails include an upper rail and a lower rail.

10. The assembly of claim 8, wherein said vertical interconnect module includes a direct access kit (DAK).

11. The assembly of claim 10, wherein said DAK includes an interconnect chosen from rigid PCB, a flexible PCB, a rigid wire support, a semi-rigid support, a short run fixed wire support, and a combination thereof.

12. The assembly of claim 10, wherein said DAK includes a mating face removably secured ahead of said horizontal rails.

13. The assembly of claim 10, wherein said DAK includes a connecting lip secured on said horizontal rails and a pull-through body extending beyond said module.

14. The assembly of claim 8, wherein said pair of spatially separated vertical rails includes at least a left rail and a right rail.

15. The assembly of claim 14, wherein said left rail and said right rail include fastener apertures along the length of said rails to space said horizontal interconnect modules along said lower tier.

16. The assembly of claim 8, wherein said horizontal interconnect module includes a DAK.

17. The assembly of claim 16, wherein said DAK includes an interconnect chosen from rigid PCB, a flexible PCB, a rigid wire support, a semi-rigid support, a short run fixed wire support and a combination thereof.

18. The assembly of claim 16, wherein said DAK includes a mating face removably secured ahead of said vertical rails.

19. The assembly of claim 8, wherein said DAK includes a connecting lip secured on the vertical rails and a pull-through body extending beyond said module.

20. A hybrid mass interconnect system to support a peripheral component interconnect extension for instrumentation (PXI) platform, a local area network extension for instrumentation (LXI) platform, and an advanced extension for instrumentation (AXIe) platform, said system comprising:
   (a) a frame having a first, second, third and fourth sides, said first and second sides opposing one another and said third and fourth sides opposing one another;
   (b) a connection assembly secured on said frame;
   (c) a universal interconnect assembly positioned within said frame and including:
      i. a vertical pull-through instrumentation (VPTI) platform supporting at least one vertical peripheral component interconnect extension for instrumentation (PXI) module, and
      ii. a horizontal pull-through instrumentation (HPTI) platform adjacent to said VPTI and supporting at least one horizontal advanced extension for instrumentation (AXIe) module; and
   (d) an interchangeable test adapter having an upper tier and a lower tier adapted to mirror and mate with said receiver, and
      wherein a modular linkage assembly having needle bearings at friction points adapted to engage said test adapter.

* * * * *